US012798525B2

(12) United States Patent
Delzeit

(10) Patent No.: US 12,798,525 B2
(45) Date of Patent: Nov. 17, 2026

(54) METHOD FOR BRAKING A COMPACTION MACHINE, AND COMPACTION MACHINE

(71) Applicant: BOMAG GMBH, Boppard (DE)

(72) Inventor: Alexander Delzeit, Boppard (DE)

(73) Assignee: BOMAG GMBH, Boppard (DE)

( * ) Notice: Subject to any disclaimer, the term of this patent is extended or adjusted under 35 U.S.C. 154(b) by 483 days.

(21) Appl. No.: 18/485,474

(22) Filed: Oct. 12, 2023

(65) Prior Publication Data

US 2024/0123952 A1 Apr. 18, 2024

(30) Foreign Application Priority Data

Oct. 12, 2022 (DE) ..................... 10 2022 210 736.5

(51) Int. Cl.
*B60T 1/06* (2006.01)
*B60T 7/12* (2006.01)
*E01C 19/26* (2006.01)

(52) U.S. Cl.
CPC ................ *B60T 1/062* (2013.01); *B60T 7/12* (2013.01); *E01C 19/262* (2013.01)

(58) Field of Classification Search
CPC ............. E01C 19/26; B60T 7/12; B60T 1/062
See application file for complete search history.

(56) References Cited

U.S. PATENT DOCUMENTS 9,745,972 B2 8/2017 Krittian et al.
2023/0099177 A1* 3/2023 Dagner .................. B62D 5/064 180/420

FOREIGN PATENT DOCUMENTS

CN 103261522 8/2013
CN 104976341 10/2015
CN 109084015 12/2018
CN 110453572 11/2019
DE 2448723 4/1976
DE 102007037357 2/2009
DE 102007037357 A1 * 2/2009 ............. B60L 58/15
DE 102011055178 5/2013
DE 102012111296 5/2014
DE 102014111824 2/2016
DE 102017221754 A1 * 6/2019 ............ F16H 39/02
DE 102019209266 12/2020
DE 102020005812 3/2022
WO 2013/083234 6/2013
WO 2019/154772 8/2019
WO WO-2020200509 A1 * 10/2020 ............. B60L 53/80

OTHER PUBLICATIONS

Office Action from related Chinese Appln. No. 202311317786.5, dated Feb. 27, 2026. English translation attached.

* cited by examiner

*Primary Examiner* — Theodore N Yao
(74) *Attorney, Agent, or Firm* — Secant IP, PLLC

(57) ABSTRACT

A method for braking a compaction machine operated by an electric motor. A compaction machine, in particular a tandem roller, single-drum roller or waste compactor, for carrying out the method.

18 Claims, 7 Drawing Sheets

METHOD FOR BRAKING A COMPACTION MACHINE, AND COMPACTION MACHINE

FIELD

The invention relates to a method for braking a compaction machine operated by means of an electric motor with a hydraulic system, in particular a tandem roller, single-drum roller or waste compactor. Moreover, the invention relates to such a compaction machine for carrying out the method.

BACKGROUND

Generic compaction machines are configured, for example, as road rollers, in particular tandem rollers, rubber-tired rollers or single-drum rollers. They are used in road and pathway construction to compact a subgrade or ground, for example asphalt layers or soil. For this purpose, the compaction machines typically have compaction drums, which are configured, for example, as roller drums with a hollow cylindrical base body and with which the compaction machines move over the ground. Such compaction drums can also be set into vibration by a vibration exciter, for example, in order to influence compaction and enable dynamic compaction in addition to a purely static compaction. It is also possible to use a compaction drum in combination with wheels, in particular rubber tires, or other travel units. In addition, compaction machines are known that have only wheels, such as so-called rubber-tired rollers, which are also used in road construction. Furthermore, so-called waste compactors are known for the compaction of landfills, which have drum-like wheel devices for ground compaction. The generic compaction machines are usually self-propelled and comprise a drive motor, which is typically an internal combustion engine, for example a diesel combustion engine. A common drive concept for such compaction machines is that the drive motor drives a hydraulic system or one or more hydraulic pumps of the compaction machine, which in turn supply hydraulic drive energy to hydraulic traction motors at the wheels or compaction drums via a suitable line system. The hydraulic pump responsible for the traction drive hydraulic circuit is also referred to as the traction pump. In the field of compaction machines, electric motors are increasingly being used as an alternative to an internal combustion engine as the primary drive unit. In this case, the hydraulic system of the compaction machine is typically driven by the electric motor.

When an internal combustion engine, such as a diesel engine, is used, it provides or builds up a supporting torque at any time during operation so that this torque can be reliably used to brake the compaction machine. When braking or during downhill travel, the hydraulic traction motors of the compaction machine act as pumps so that a torque applied to the traction motors is transmitted to the traction pump, which then acts as a motor. In practical use of such compaction machines, the supporting torque of the combustion engine is used to support this torque applied to the traction pump, thus braking the compaction machine as a whole. This effect is commonly referred to as "engine brake." One challenge when switching from an internal combustion engine to an electric motor-driven compaction machine is that it is not possible to reliably build up a supporting torque or braking torque which can be used to brake the compaction machine using an electric motor. For example, reduced supporting torques may occur depending on the state of charge of the battery or also depending on the power reduction of the electric motor and/or the inverter. This in turn has a negative effect on the braking behavior of the compaction machine and can possibly lead to hazards and safety risks. In addition, due to the significantly reduced mass moment of inertia of the electric motor compared to internal combustion engines, high overspeeds can occur at the electric motor, so that with unchanged hydraulic transmission in the traction drive system an increase in travel speed occurs and maximum permissible speeds of hydraulic components are exceeded as a result. In addition, the electric motor, the inverter and/or the battery may overheat, particularly in the case of heavy or frequently repeated braking, especially due to a supply of electrical energy by recuperation. This can even result in the compaction machine having to stop operation as a precaution or its components being damaged.

SUMMARY

It is therefore the object of the present invention to provide a solution for reliable, efficient and safe braking in a compaction machine driven by an electric motor and having a hydraulic or electric traction drive system.

Thus, one aspect of the invention relates to a method for braking a compaction machine operated by means of an electric motor, in particular a tandem roller, a single-drum roller, a rubber-tired roller or a waste compactor. The method according to the invention may, for example, be carried out at least partially by a control device, in particular an electronic control device, of the compaction machine. The control device may be part of an on-board computer of the compaction machine or it may be the on-board computer. That the compaction machine is operated by means of an electric motor means that the electric motor is, for example, the primary drive source of the compaction machine. The electric motor can thus provide drive energy that is used to operate the compaction machine, in particular for travel operation. In particular, the electric motor may be the sole, exclusive primary drive source of the compaction machine. The electric energy required to power the electric motor can be provided by a suitable energy storage device, such as a battery. However, it is also possible to make use of an electric energy-generating unit for this purpose, for example a fuel cell or an internal combustion engine and/or a generator. The generator, in turn, can be driven by an internal combustion engine, for example, although the internal combustion engine is not directly mechanically connected to the drive train of the compaction machine. If an internal combustion engine is provided as the primary drive unit, at least one conversion of the mechanical energy generated by this engine into electrical energy takes place, directly or indirectly, on the output side of the internal combustion engine, which in turn is at least also used to drive the hydraulic traction drive system. Apart from electrical components which, like the electric motor, are supplied from an electric energy source, for example a battery, all mechanically or hydraulically driven traction drive and/or compaction components of the compaction machine are preferably driven by the electric motor or another electric drive system. In a preferred embodiment, the electric motor can thus replace an internal combustion engine that has been commonly used as a primary drive source. In other words, the compaction machine according to the invention is therefore also preferably configured completely free of internal combustion engines, in particular as a traction drive motor, or on the output side of an electric motor with a "traction drive system free of internal combustion engines". Driving the compaction machine, in particular the traction drive system, using an electric motor may be performed indirectly, for example by the electric motor driving a hydraulic pump, which in turn feeds hydraulic fluid via a suitable hydraulic circuit to a hydraulic motor, which in turn constitutes the traction motor. However, driving the compaction machine using an electric motor may also be performed directly in that the traction drive of the travel units, such as drums and/or rubber tires, is performed by an electric traction motor.

Against this background, the method according to the invention for braking a compaction machine, in particular a tandem roller, single-drum roller, rubber-tired roller or waste compactor, which is at least partially operated by means of an electric motor, provides for the steps of (directly or indirectly) driving a travel unit using an electric motor, determining an actual value of an operating parameter, determining a target value of the operating parameter, comparing the actual value of the operating parameter with the target value of the operating parameter; generating a braking torque by means of a hydraulic throttle in a brake hydraulic circuit, the brake hydraulic circuit comprising a brake hydraulic pump, if the actual value of the operating parameter deviates from the target value, in particular is greater than the target value of the operating parameter, the throttle being arranged in a hydraulic line with a hydraulic pump; and transmitting the braking torque via a mechanical coupling from the brake hydraulic pump to a device directly or indirectly driving the travel unit. Details of individual steps are explained in more detail below. An essential idea is that with the aid of the brake hydraulic circuit and the throttle, the flow cross-section of which is ideally adjustable by the control device, a kind of supporting torque can be generated which can ultimately be transmitted via the mechanical coupling to a device directly or indirectly driving the travel unit and thus ultimately to the travel unit. A device directly driving the travel unit is understood to be, for example, an electric motor that drives a rotary motion of at least one of the travel units via a purely mechanical drive train or directly via a shaft. A device indirectly driving the travel unit is understood to be, for example, an electric motor that drives at least one of the travel units via at least two energy conversion steps, in particular from electric to hydraulic and then from hydraulic to mechanical. The hydraulic throttle is preferably configured such that it can be continuously adjusted within an adjustment range with respect to its opening cross-section. For this purpose, the hydraulic throttle may in particular be configured as a proportional valve.

The method according to the invention thus comprises determining or identifying an actual value of an operating parameter. The operating parameter may be, for example, a speed of the electric motor. This refers to the speed of the electric motor driving the traction pump. Additionally or alternatively, the operating parameter may be a travel speed of the compaction machine. For example, the actual values may be captured by one or more speed sensors at the electric motor and/or at least one traction motor of a traction drive hydraulic circuit. Corresponding speed sensors may be provided at one roller drum or at one wheel or at all roller drums and/or all wheels. Alternatively, the travel speed may also be determined by scanning the ground, in particular optically, for example using a camera. More specifically, to this end, distances traveled in a time interval may be determined by comparing images taken successively in time to thus calculate a movement or travel speed. Additionally or alternatively, the operating parameter may also be a temperature, for example of the electric motor and/or a converter or inverter and/or a battery. Temperature sensors may in this case be provided at the electric motor and/or the converter or inverter and/or the battery. Alternatively or additionally, the operating parameter may also be the state of charge of the battery, for which a state of charge sensor may be provided. Additionally or alternatively, the operating parameter may also be an amperage through the electric motor and/or the converter or inverter. An amperemeter may be arranged at a suitable position for this purpose. Finally, the operating parameter may, additionally or alternatively, also be a torque applied on the electric motor, which may be determined by a torque sensor at the electric motor, for example. Alternatively, the operating parameter may be one or more parameters directly or indirectly correlating with any one of said parameters, or a combination of at least two of said parameters and/or correlating parameters. The respective actual values are forwarded to the control device. The sensor(s) is/are thus in signal transmission connection with the control device for transmission of actual values or actual measured values. This connection, like the signal transmission connections mentioned below, may be wired or wireless.

Furthermore, the method according to the invention comprises determining or setting a target value for the operating parameter(s). These values, in particular for the speed of the electric motor and the travel speed of the compaction machine, can be read, for example, directly or indirectly from the adjustment position and/or a change in adjustment position of a control lever or from another control input by an operator, for example at the control device. If applicable, corresponding targets may also be derived from the current operating state of the compaction machine, for example if desired speeds or travel speeds are specified for the working operation of the compaction machine, so that the control device can infer the respective target values from a current operating state. target values for the temperature of the various components mentioned, as well as for the state of charge of the battery and the amperage through the electric motor or the converter, as well as for the torque at the electric motor, can also result in particular from considerations or regulations on operational safety and/or manufacturer specifications. For example, these values must be kept within a range considered safe for continuous operation of the compaction machine. This range may vary depending on the structural nature of the components. The determination of specific suitable target values for these parameters thus depends on a large number of individual factors and lies within the knowledge and ability of a person skilled in the art.

Based on the identified actual value and the set target value, the actual value is compared with the target value. In particular, in this step the control device identifies operating states in which the actual values deviate from the target values, in particular the actual values exceed the target values. This can occur, for example, when the compaction machine accelerates unintentionally due to external factors, for example, because it is moving along a downward sloping path. Additionally or alternatively, the target value may also be reduced below the actual value, for example by an operator actuating a control lever and reducing the specified travel speed to be set (which corresponds to the target value). In addition, an actuation of a brake by an operator can signal a reduced target speed or target travel speed compared to the actual speed or actual travel speed. An increased temperature of the electric motor, the converter or inverter, or the battery indicates that these components are overloaded during braking, for example, which is why it is necessary to obtain the braking power from other components. If the battery's state of charge is too high, it cannot, for example, absorb the electric energy generated during braking and resulting from recuperation, which is why operation of the electric motor as a generator is also unsuitable for braking in this case. The same applies to the amperage through the electric motor or the converter and the torque at the electric motor. If these are too high, braking power must be obtained from other components. Accordingly, the operating situation that is in the focus of the invention is when the actual value is greater than the target value and thus the actual value is to be reduced. In this case, the compaction machine may be on an overrun. This means, for example, that traction motors of a traction drive hydraulic circuit are kept in rotation by their mechanical coupling with the compaction drums or wheels of the compaction machine, i.e., are then driven by them and thus act as pumps. The hydraulic fluid then conveyed in the traction drive circuit then present can be routed via the line system of a traction drive hydraulic circuit to the traction pump, which then acts as a motor in this operating situation. The traction drive hydraulic circuit and other parts of the compaction machine's drive train connected to the traction pump, including for example a steering feed pump, are then dragged along by the overrun. As mentioned at the outset, the compaction machine according to the invention preferably has only the electric motor and no internal combustion engine as the traction drive system. A supporting torque normally provided reliably by the internal combustion engine, which could be used to counteract or support the corresponding torque on the traction pump acting as a motor during overrun, is therefore not available according to the invention and cannot be provided reliably by the electric motor.

In a particularly preferred embodiment of the invention, the hydraulic system of the compaction machine comprises a traction drive hydraulic circuit having at least one traction pump drivable by the electric motor. The traction pump supplies hydraulic fluid to traction motors of the traction drive hydraulic circuit, so that the traction motors drive the rotation of the compaction drums or wheels of the compaction machine, causing the latter to move over the ground to be compacted. The traction pump is explicitly not driven mechanically by an internal combustion engine that may be present for operating a generator, but, in particular, exclusively by the electric motor. Accordingly, the method according to the invention then preferably comprises driving a traction pump in a traction drive hydraulic circuit of the compaction machine by the electric motor. The traction drive hydraulic circuit is preferably configured as a closed hydraulic circuit. The traction pump is preferably configured as a pump with variable delivery volume, for example, in order to be able to vary the travel speed and/or the available traction drive torque of the compaction machine. For this purpose, the traction pump may be variable-speed and/or configured as a variable displacement pump. Additionally or alternatively, it is also possible to configure the hydraulic traction motor driven by the traction pump as a variable displacement motor.

In this preferred embodiment, the method according to the invention may particularly comprise driving a steering feed pump in a steering hydraulic circuit of the compaction machine, for example also by the electric motor or a further electric motor or electric drive unit. For example, the pump itself may be driven electrically. Additionally or alternatively, the steering feed pump may be driven by the same electric motor that drives the traction pump. In this case, the two pumps may be arranged in a tandem arrangement. The steering feed pump supplies the steering hydraulic circuit with hydraulic energy. A steering device is arranged in the steering hydraulic circuit. This device may be a single-stage or multi-stage steering orbitrol. In contrast to the traction pump, the steering feed pump is preferably configured as a fixed displacement pump, for example a gear pump. This ensures that the steering device is continuously supplied with hydraulic fluid so that reliable steering is possible in all operating situations. In addition to supplying the steering hydraulic circuit, according to the invention, the steering feed pump also feeds hydraulic fluid into the traction drive hydraulic circuit. In this way, hydraulic fluid losses in the traction drive hydraulic circuit can be compensated. The steering feed pump is therefore a single pump that serves in dual function both as a steering pump for the steering hydraulic circuit and at the same time as a feed pump for the traction drive hydraulic circuit. This pump may be configured as a fixed displacement pump but also as a variable displacement pump. This steering hydraulic circuit is then the brake hydraulic circuit. Finally, in this preferred embodiment, the steering feed pump may be coupled to the traction pump via a mechanical coupling, in particular directly via a shaft. For example, the traction pump and the steering feed pump are both operatively connected to a common output shaft of the electric motor, which may be configured as a through-drive unit for this purpose, for example, or a mechanical coupling separate from the electric motor is provided. Coupling via a gearbox is also possible as long as a mechanical coupling between the two pumps is maintained. The mechanical coupling between the traction pump and the steering feed pump allows torque to be transmitted between these two pumps. In other words, the method according to the invention thus also comprises transmitting torque forces between the traction pump and the steering feed pump via a, in particular direct, mechanical coupling of these two pumps to each other. In this specific case, the steering feed pump is then the brake hydraulic pump.

For the case constellations described above, in particular that the actual value of the operating parameter is greater than the target value, the invention provides for generating a braking torque at the brake hydraulic pump, for example the steering feed pump. This is initially achieved by a hydraulic throttle arranged in the brake hydraulic circuit, which is arranged in a hydraulic line between the brake hydraulic pump, in particular steering feed pump, and a tank outlet provided downstream of the brake hydraulic pump. Other components may be arranged in this brake hydraulic circuit and/or may be supplied by it, such as the steering device, for example the steering orbitrol, which may be arranged in the steering hydraulic circuit. In this case, the steering hydraulic circuit thus at the same time also at least partially forms the brake hydraulic circuit.

For example, the throttle may be configured as a proportional pressure-limiting valve, which is controlled in particular by the control device. By controlling the throttle, the control device can set an almost arbitrary pressure drop at the hydraulic throttle within system-related limits. In this way, a back pressure can be generated or controlled downstream of the brake hydraulic pump, in particular the steering feed pump, or a flow resistance can be controlled downstream of the brake hydraulic pump against which it pumps. In other words, a braking torque is generated at this point. Due to the defined working volume of the brake hydraulic pump, in particular steering feed pump, or the defined delivery volume of the brake hydraulic pump, in particular steering feed pump, at constant speed, this back pressure in the brake hydraulic circuit, in particular steering hydraulic circuit, can be used in the present arrangement to generate a supporting torque, for example at the traction pump, and thus as a braking torque for the machine. The mechanical coupling of the brake hydraulic pump, in particular the steering feed pump, with the traction pump results in a mechanical transmission of the braking torque generated at the brake hydraulic pump, in particular the steering feed pump, during overrun of the compaction machine, in particular directly, for example to the traction pump of the traction drive hydraulic circuit, which thus supports the latter. Accordingly, the method according to the invention may provide for transmitting the braking torque, in particular directly, from the steering feed pump via the mechanical coupling to the traction pump of the traction drive hydraulic circuit or, more generally, from the brake hydraulic pump to a device, in particular an electric motor, which drives at least one of the travel units directly or indirectly. The amount of braking torque provided can be adjusted almost arbitrarily and continuously by the control device, for example by changing the flow cross-section or the pressure drop across the throttle. Specifically, it is possible, for example, to control such a change in the flow cross-section by applying a corresponding current to the throttle or the proportional pressure-limiting valve. The value of the braking torque set by the control device is preferably proportional to the difference between the actual value and the target value of the operating parameter. For example, control can be achieved using various controller structures known per se in the prior art, such as PI controllers, PID controllers, state-based controllers, etc.

However, the hydraulic throttle does not need to be activated immediately whenever the actual value of the operating parameter is greater than the target value. For example, a tolerance range may be specified within which the actual value of the operating parameter can be above the target value without directly setting a braking torque at the brake hydraulic pump, in particular steering feed pump. Only when the actual value of the operating parameter leaves, for example exceeds, the tolerance range, will the control device control the hydraulic throttle to generate a braking torque at the brake hydraulic pump, in particular the steering feed pump. The extent of the tolerance range may be fixed or dynamically adapted to the operating situation. For example, the control device may calculate a threshold value defining the tolerance range, which is, for example, a predetermined percentage value, in particular 5% or 10% or 15% or 20% or 25% or 30% above the target value of the operating parameter. Only when this threshold value is exceeded is the throttle then activated to generate a braking torque. Additionally or alternatively, it is also possible to provide a tolerance time, i.e., a predetermined time period for the duration of which the actual value of the operating parameter may be greater than the target value without the control device controlling the throttle to generate a braking torque. The same also applies to leaving the tolerance range, as explained above. Thus, a tolerance range and a tolerance time may be used together. This means that the throttle is not necessarily controlled immediately when the actual value of the operating parameter is greater than the target value of the operating parameter. Instead, the expiration of the tolerance time is waited for first. Only if the respective threshold values are still exceeded after the tolerance time has elapsed does the control device control the throttle to generate a braking torque at the brake hydraulic pump, in particular the steering feed pump. The tolerance time may be, for example, a maximum of 1 s or a maximum of 3 s or a maximum of 5 s or a maximum of 10 s. In addition, the tolerance time may be adjusted dynamically depending on the operating situation of the compaction machine, for example, depending on the actual value of the operating parameter. For example, the tolerance time may be reduced as the travel speed increases to ensure that the overall system responds quickly at high travel speeds.

According to a preferred embodiment, the braking torque set at the brake hydraulic pump, in particular steering feed pump, may be increased as long as the difference between the actual value of the operating parameter and the target value of the operating parameter increases, in particular proportionally to this difference. Moreover, the braking torque does not have to be reduced again immediately when this difference decreases again. Instead, it is preferred that after an increase in the braking torque, in particular proportional to said difference, the braking torque is kept constant, in particular even if the difference decreases again. Preferably, the braking torque is kept constant, for example, until the actual value of the operating parameter has fallen back to or below the target value, i.e., until the difference is zero. In this way, even in the event of strong, unintended accelerations or other deviations from optimum operation of the compaction machine, correspondingly strong counteraction is taken.

The method according to the invention provides a number of advantages. For example, a braking torque may be provided for a traction drive hydraulic circuit without the hydraulic throttle being arranged in the closed traction drive hydraulic circuit for this purpose, but in an open steering hydraulic circuit. The heat generated at the throttle in the hydraulic medium is therefore distributed over a larger volume, including in the hydraulic tank, and can also be dissipated more easily via a cooler, which is also located in the steering hydraulic circuit, for example, ideally downstream of the throttle and/or the steering orbitrol. This can also lower the temperature of the electric motor, the converter or inverter and the battery, or at least reduce their heating. By taking into account the state of charge of the battery, overcharging can be avoided. By using a hydraulic throttle, which can be controlled as desired by the control device, a braking torque of almost any desired magnitude can be provided within the system limits, which also makes the braking effect or braking action adjustable and variable within a comparatively large range of action. The invention therefore enables comparatively slow deceleration up to rapid emergency braking to a standstill of the compaction machine. In addition, alternative braking options, such as the use of dynamic service brakes, are considerably more space and cost intensive. The fact that the throttle can always be controlled such that sufficient hydraulic medium circulates in the steering hydraulic circuit ensures an uninterrupted, adequate supply to the steering system. The use of one or more priority valves, especially in the steering hydraulic circuit, is therefore not necessary. By using the steering feed pump, which is typically present in compaction machines anyway, the system is also particularly simple in structure and thus cost-effective.

The magnitude of the braking torque provided depends not only on the adjustment of the throttle, in particular its flow cross section, but also on the hydraulic pressure applied to the brake hydraulic pump, in particular steering feed pump, and on the delivery volume of the brake hydraulic pump, in particular steering feed pump. It may therefore be expedient to use a brake hydraulic pump, in particular a steering feed pump, with a variable delivery volume at this point, although in the present specific implementation, the use of a fixed displacement pump as a brake hydraulic pump, in particular a steering feed pump, is preferred. Another way of increasing the braking torque provided can therefore also be achieved by reducing a displacement of a traction pump while the braking torque is being transmitted. The traction pump is preferably designed as a pump with variable displacement and is also controlled by the control device, for example, so that its displacement can be adjusted by the control device. During overrun, the traction motors operate as pumps and therefore deliver a certain volume of hydraulic fluid to the traction pump. This hydraulic fluid is then conveyed through the traction pump and drives it. If the displacement of the traction pump is reduced, the speed of the traction pump increases in order to handle the volume flow delivered by the traction motors. Due to the direct mechanical coupling of the traction pump and the steering feed pump, this increased speed is in turn transmitted to the steering feed pump, whose delivery volume per time increases as a result, which in turn results in an increased braking torque. Overall, therefore, the braking torque can be increased during a braking process during overrun by reducing the displacement of the traction pump.

The traction drive hydraulic circuit and the steering hydraulic circuit are separate hydraulic circuits between which hydraulic fluid is essentially exchanged, if at all, only via a common hydraulic fluid tank and possibly merged return lines to the tank. However, a further connection between the traction drive hydraulic circuit and the steering hydraulic circuit may, if necessary, consist merely of a feed line which originates from the steering hydraulic circuit and feeds hydraulic fluid into the traction drive hydraulic circuit, in particular to compensate for leakage losses in the traction drive hydraulic circuit. The circuits, on the other hand, preferably do not have any common functional units driven by them in each case and are therefore also each operated by a separate pump exclusive to the respective hydraulic circuit. In the event that the compaction machine has further hydraulic working devices, for example a vibration exciter, usually an imbalance exciter, in a compaction drum, it is preferred that a further, separate working hydraulic circuit is provided to operate these working devices. In other words, it may be preferred that the hydraulic system of the compaction machine comprises a working hydraulic circuit, in particular an imbalance drive hydraulic circuit, separate from the traction drive hydraulic circuit and the steering hydraulic circuit, this working hydraulic circuit being operated, preferably exclusively, by a working pump separate from the steering feed pump. The working hydraulic circuit is therefore preferably also connected to the other hydraulic circuits of the compaction machine exclusively via the hydraulic fluid tank and, if provided, merged return lines to the tank. If there are other closed hydraulic circuits, these can also be fed to compensate for leakage losses only, including from the steering hydraulic circuit. What is essential is that the working hydraulic circuit in particular is completely separate from the steering hydraulic circuit so that the continuous supply of hydraulic fluid to the steering system or a steering device is always ensured even without the use of a priority valve. The working pump exclusively operates working devices arranged in the working hydraulic circuit and, in particular, does not operate any other functional units located in the other hydraulic circuits. All the pumps mentioned, i.e., the traction pump, the steering feed pump and the working pump, may be operated by the electric motor. For example, the pumps are arranged on a common shaft of the electric motor or are connected to each other via through-drive units. At least the traction pump is always driven by the electric motor described herein, which is also used to control the method. The steering feed pump and the working pump may, if applicable, be driven by separate electric drive units, for example separate electric motors, wherein it is preferred that at least the steering feed pump and the traction pump are driven by a common electric motor.

By providing a braking torque to the steering feed pump, the steering hydraulic circuit absorbs kinetic energy of the compaction machine. This heats up the hydraulic fluid or hydraulic oil and the other components of the steering hydraulic circuit. According to a preferred embodiment of the invention, it is now ensured that the provision of the braking torque at the steering feed pump does not cause the steering hydraulic circuit to heat up too much, so that components of the steering hydraulic circuit could be damaged. For this purpose, for example, a threshold value may be specified for the temperature of the steering hydraulic circuit, in particular for the temperature of the hydraulic fluid. This threshold value is, for example, a maximum value, i.e., a temperature that should not be exceeded. It is then preferred that determining of a temperature in the steering hydraulic circuit, for example of the hydraulic fluid in the steering hydraulic circuit, is performed, and that no braking torque is generated at the steering feed pump by the hydraulic throttle when the temperature in the steering hydraulic circuit is greater than a predetermined threshold value. In other words, it is checked whether the steering hydraulic circuit is capable of absorbing kinetic energy in the form of thermal energy. Only if this is the case, i.e., if the temperature in the steering hydraulic circuit is below the threshold value, is a braking torque provided at the steering feed pump according to the invention. This ensures that the steering hydraulic circuit, and in particular the safety-relevant steering system, does not overheat.

It may be advantageous if a return path or return line of the steering hydraulic circuit and a leakage return path or leakage return line of the traction drive hydraulic circuit are merged and fed together into a tank. This saves components and space, simplifying the overall system.

It may be preferred that when the braking torque is transmitted via the mechanical coupling from the brake hydraulic pump to the device directly or indirectly driving the travel unit, in particular the traction pump or traction motor, a speed transmission takes place. In this way, an adaptation to current speed requirements is possible.

For embodiments in which at least one of the travel units is driven by a hydraulic traction motor, the hydraulic traction motor may further be coupled via a mechanical coupling to a brake hydraulic pump, in particular configured with adjustable delivery volume, the brake hydraulic pump being part of a brake hydraulic circuit separate from the traction drive hydraulic circuit, and the hydraulic throttle being arranged in the brake hydraulic circuit, in particular downstream of the brake hydraulic pump, with the step that the braking torque is generated at the brake hydraulic pump by the hydraulic throttle, and that the braking torque is transmitted from the brake hydraulic pump via the mechanical coupling to the hydraulic traction motor of the traction drive hydraulic circuit. This arrangement can be simplified to such an extent that the sole function of the brake hydraulic circuit and the brake hydraulic pump is to generate the additional braking or supporting torque as described above, depending on the situation.

Generally, it is possible that the method according to the invention also comprises charging a hydraulic accumulator in operating phases in which a braking torque is generated in the brake hydraulic circuit via the brake hydraulic pump. This stored hydraulic energy can later be used for functions of the compaction machine, such as a boost function, drive functions for auxiliary units, etc.

The object mentioned at the beginning is also achieved with a compaction machine, in particular a tandem roller, a single-drum roller or a waste compactor, with a hydraulic system, an electric motor and a control device, wherein the control device is configured to carry out the method according to the invention. The control device may, for example, control all the components of the compaction machine involved in the method. At least determining an actual value of an operating parameter, determining a target value of the operating parameter, and comparing the actual value of the operating parameter with the target value are performed by the control device. In addition, the control device controls the throttle in particular in order to generate the braking torque there. All features, effects and advantages of the method according to the invention described herein also apply mutatis mutandis to the compaction machine according to the invention and vice versa. Merely to avoid repetitions, reference is made to the respective other explanations.

The compaction machine may have a traction drive hydraulic circuit with a traction pump driven by the electric motor, the traction pump being configured in particular as a variable displacement pump, i.e., having a variable or adjustable delivery volume. For example, it is mechanically driven by an output shaft of the electric motor. The mechanical drive connection, for example in the form of the output shaft, between the electric motor and the traction drive pump is ideally clutch-free. The variable displacement pump and, in particular, the variable delivery volume are controlled, for example, via the control device. The traction drive hydraulic circuit is preferably configured as a closed hydraulic circuit. In particular, it has at least one traction motor at a compaction drum and/or at a wheel of the compaction machine, the traction motor generating a torque for the compaction drum and/or the wheel from the volume flow of the traction pump. When the compaction machine brakes or descends a slope, i.e., when the compaction machine is on an overrun, the traction motor is rotated via the mechanical connection to the compaction drum and/or wheel and therefore acts as a pump. Due to the closed hydraulic circuit, this torque is transmitted to the traction pump, which acts as a motor. As described earlier, the basic idea of the invention is to support this torque at the traction pump by a braking torque generated at the steering feed pump.

For this purpose, the compaction machine preferably has a steering feed pump, in particular also driven by the electric motor, in a steering hydraulic circuit, the steering feed pump being configured in particular as a fixed-displacement pump, i.e., with a constant delivery volume, for example as a gear pump. The steering feed pump provides a volume flow in the steering hydraulic circuit, via which in particular a steering device such as a steering orbitrol is supplied. In addition, the steering feed pump is preferably configured to feed hydraulic fluid into the traction drive hydraulic circuit, which is in particular configured as a closed circuit. This compensates a loss of hydraulic fluid in the traction drive hydraulic circuit and realizes cross-scavenging. However, no drive energy is introduced into the traction drive hydraulic circuit by the steering feed pump. The drive energy of the traction drive hydraulic circuit comes exclusively from the traction pump or, during overrun, from the compaction drums or wheels of the compaction machine. In this respect, the steering hydraulic circuit and the traction drive hydraulic circuit are configured separately from each other and kept apart.

Preferably, the traction pump is coupled to the steering feed pump via a mechanical coupling. In this way, torque can be transmitted between these pumps. In particular, excess torque at the traction pump during overrun can be countered by a braking torque at the steering feed pump. To generate this braking torque, a hydraulic throttle is preferably arranged in a hydraulic line between the steering feed pump and a steering device of the steering hydraulic circuit. The hydraulic throttle is configured to be controllable by the control device, in particular such that the control device can set how large the flow obstruction formed by the throttle is to be. In other words, the pressure drop across the throttle can be adjusted by the control device. The control device may, for example, control the throttle such that the throttle does not represent a flow obstruction and there is also no pressure drop across it. In this case, no braking torque is generated either. However, the control device may also control the throttle, for example, such that there is a pressure drop across it, resulting in a braking torque at the steering feed pump. The amount of this braking torque can be adjusted by the control device as required. In a preferred embodiment, the hydraulic throttle is configured as a proportional pressure-limiting valve. On the one hand, this enables reliable and demand-oriented control of the braking torque via the control device and, on the other hand, a permanent supply of the steering device in the steering hydraulic circuit with a sufficient volume flow can be ensured at the same time by appropriate control of the throttle. Depending on the existing operating situation, a required braking torque can thus be provided to brake the compaction machine.

In addition to the traction drive hydraulic circuit and the steering hydraulic circuit, the hydraulic system of the compaction machine may have a further hydraulic circuit separate from these for operating further working devices. For example, this circuit may be a hydraulic circuit for operating a vibration exciter in a compaction drum. For example, it is preferred if a working hydraulic circuit separate from the traction drive hydraulic circuit and the steering hydraulic circuit is provided with a working pump, wherein the working pump may be in drive connection with the electric motor. The working pump is therefore also preferably driven by the electric motor and is located, for example, on an output shaft of the electric motor or on a through-drive unit of one of the other pumps. Alternatively, the working pump may be driven by an electric drive unit separate from the electric motor, for example another electric motor. By arranging another working hydraulic circuit, separate from the other hydraulic circuits, in the hydraulic system of the compaction machine, complicated hydraulic circuits and components can be avoided. For this purpose, it is particularly important that other working devices besides the throttle and the steering system are not arranged in the steering hydraulic circuit, i.e., are not operated by the steering feed pump. In this way, for example, a priority valve in the steering hydraulic circuit can be dispensed with. It is therefore also preferred that the steering feed pump and the hydraulic lines it supplies are free of priority valves.

In order for the control device to be able to adapt the control of all components of the system and, in particular, the amount of braking torque provided at the steering feed pump to the current operating situation of the compaction machine as required, the control device is supplied with various relevant control variables. The following discussion refers to the electric motor driving the traction pump. For this purpose, it is preferred that a speed sensor is provided at the electric motor and/or at a traction motor of the traction drive hydraulic circuit, the speed sensor being connected to the control device and transmitting its measured values to it.

In particular, the speed sensor is configured to determine an actual speed of the electric motor and/or an actual travel speed of the compaction machine or a parameter correlating therewith. Additionally or alternatively, a temperature sensor may be provided, for example at the electric motor, the converter or inverter, or the battery. It is also possible that multiple temperature sensors are provided at several of these components simultaneously. Moreover, a charge state sensor at the battery and/or an amperemeter for determining the amperage through the electric motor and/or the converter or inverter and/or a torque sensor at the electric motor may additionally or alternatively be provided. All of these sensors are connected to the control unit and transmit their measured values to it. These are used as input variables in the method according to the invention, in particular as actual values of the operating parameter. In addition, the control device is preferably configured to determine a target value of the operating parameter, for example a target speed of the electric motor and/or a target travel speed of the compaction machine and/or a target temperature of the electric motor and/or of the converter or inverter and/or of the battery and/or a target state of charge of the battery and/or a target amperage through the electric motor and/or the converter or the inverter and/or a target torque at the electric motor or a parameter correlating therewith. For this purpose, for example, a setting of an operating element of the compaction machine may be used, for example the position of a control lever which can be adjusted by an operator and which specifies a desired travel speed. Other target values result from safety considerations. The target value, for example the target speed or the target travel speed, are used in the method according to the invention as target variables with which the values of the input variables are to be compared. By means of the corresponding comparison, the control device determines whether the compaction machine is currently on an overrun, i.e., whether the compaction machine is currently being braked or is to be braked and/or is descending a slope.

In particular, the control device is configured to generate a braking torque at the steering feed pump by means of the hydraulic throttle if the actual value of the operating parameter, for example the actual speed and/or the actual travel speed or the parameters correlating therewith, is greater than the target value, for example the target speed and/or the target travel speed or the parameters correlating therewith. The control device is thus configured to generate a braking torque at the steering feed pump by means of the hydraulic throttle when the compaction machine is on an overrun and the control device detects this by comparing the actual values with the target values. In this way, the steering feed pump counteracts the torque generated by the overrun at the traction pump via the mechanical coupling of the two pumps and thus, according to the invention, replaces the conventional internal combustion engine. In this way, it is possible to provide an appropriate supporting or braking torque also for an electrically operated compaction machine. It is therefore possible to retain the hydrostatic traction drive systems with static parking brakes that are conventionally used without having to switch to more expensive alternatives.

A particularly space-saving and simple structure can be achieved if a return path of the steering hydraulic circuit and a return path of the traction drive hydraulic circuit and, if applicable, also a return path of the working hydraulic circuit are configured to open together into a tank or the hydraulic tank. The corresponding return paths are therefore merged so that only a single return line has to run to the hydraulic tank, thus saving installation space and giving the system a simpler overall structure.

Additionally or alternatively, a hydraulic accumulator may be provided which is connected to the brake hydraulic circuit, in particular the steering hydraulic circuit, via an accumulator charging valve. This allows the brake hydraulic circuit to be used to charge the hydraulic accumulator, especially during phases when braking torque is to be generated.

According to the invention, the compaction machine may additionally or alternatively comprise a travel unit driven by means of a hydraulic motor, in particular directly via a shaft, and a brake hydraulic pump of the brake hydraulic circuit mechanically coupled to this hydraulic motor, in particular via a transmission stage. Additionally or alternatively, the compaction machine may comprise a travel unit driven by means of an electric motor, in particular directly via a shaft, and a coupling gearbox via which the electric motor can be mechanically coupled to a brake hydraulic pump of a brake hydraulic circuit, the brake hydraulic circuit comprising the hydraulic throttle, in particular downstream of the brake hydraulic pump. Such an arrangement described above may be assigned to each drum of the compaction machine.

In a further preferred embodiment of the invention, the compaction machine may be configured such that each of the travel units, in particular each of the compaction drums, comprises its own brake hydraulic circuit separate from the other ones, and further comprises at least one of the following features: A separate hydraulic accumulator is assigned to each brake hydraulic circuit; a common hydraulic accumulator is provided, which is connected, in each case via a respective supply line, to at least two brake hydraulic circuits, in each case via a respective accumulator charging valve or via a common accumulator charging valve; the throttles of the two brake hydraulic circuits can be controlled independently of one another, and the control device is configured such that it controls the two throttles independently of one another and/or taking into account the current direction of travel. In particular, this embodiment allows independent control of the braking torque acting on a front and a rear travel unit, respectively, which is generated by the above devices. This can be particularly advantageous if machine-specific moments of inertia applied to the respective travel units vary depending on the current direction of travel of the compaction machine.

BRIEF DESCRIPTION OF THE DRAWINGS

The invention will be explained in more detail below by reference to the embodiment examples shown in the figures. In the schematic figures.

DETAILED DESCRIPTION

Figure 1:
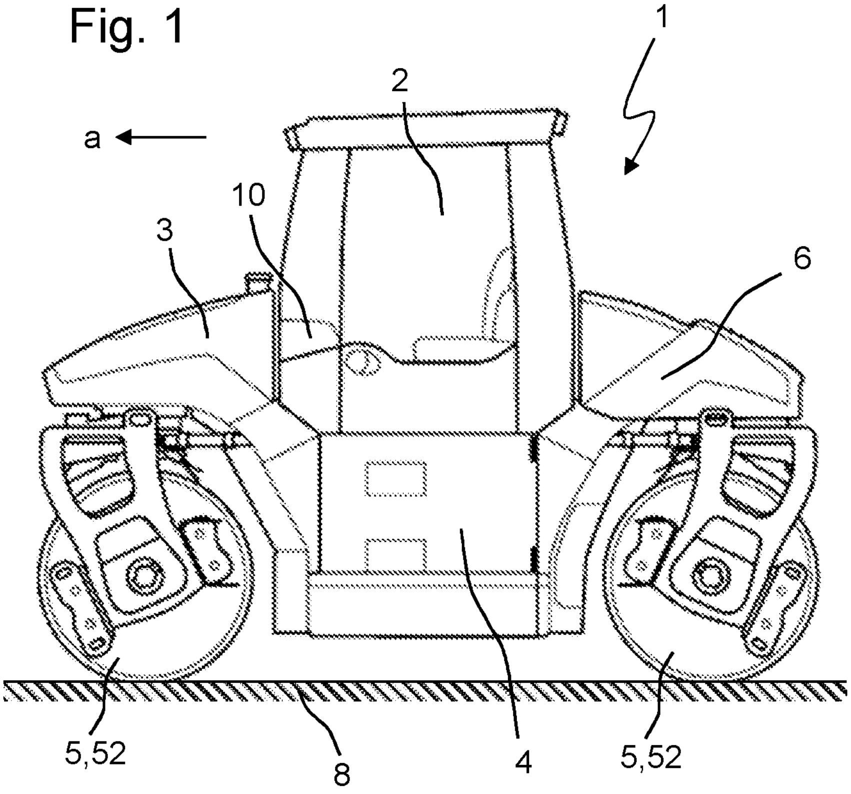
FIG. 1: shows a side view of a compaction machine, in this case a tandem roller.

Like parts or functionally like parts are designated by like reference numerals in the figures. Recurring parts are not necessarily designated separately in each figure.

Figure 2:
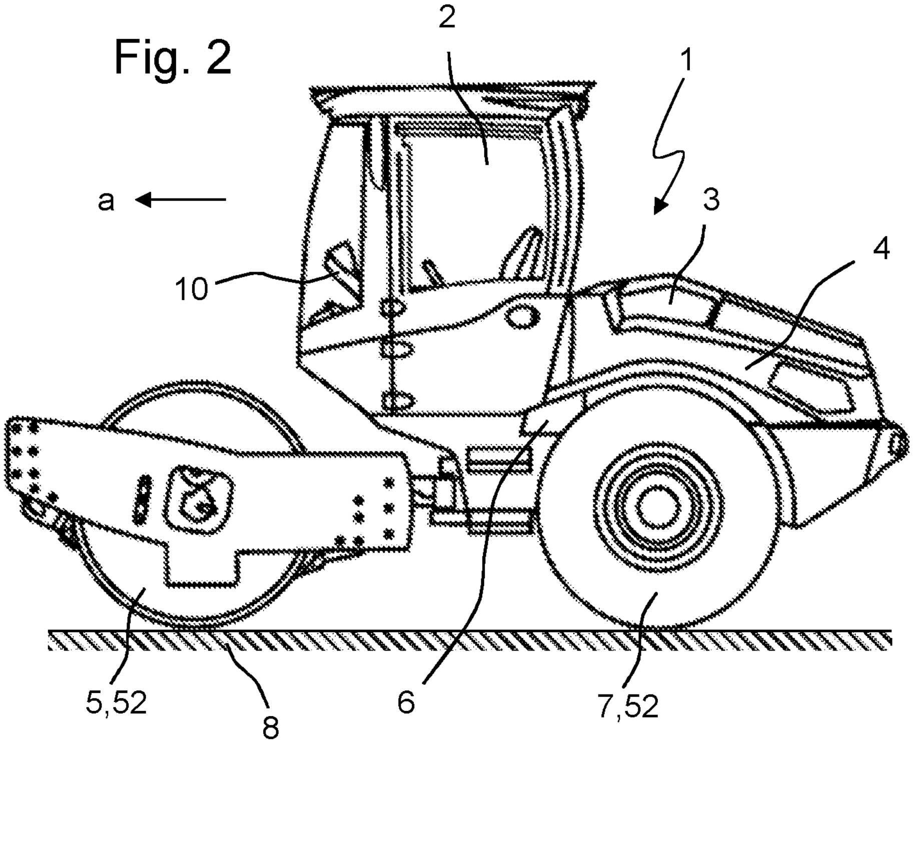
FIG. 2: shows a side view of a compaction machine, in this case a single-drum roller.
Figure 3:
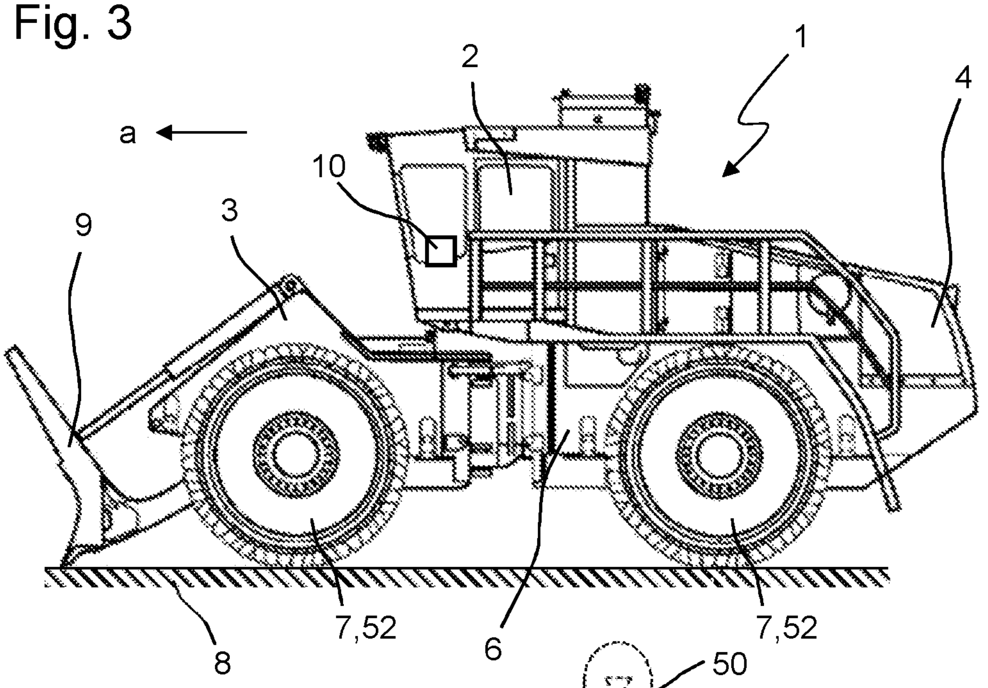
FIG. 3: shows a side view of a compaction machine, in this case a waste compactor.

FIGS. 1, 2 and 3 show examples of various compaction machines 1 according to the invention. For example, FIG. 1 shows a tandem roller, more specifically a pivot-steered tandem roller, which is typically used for asphalt compaction. Alternatively, articulated tandem rollers or rubber-tired rollers may be used, the respective machine frame structure of which is known in the prior art. FIG. 2 shows a single drum roller with a front and a rear carriage, typically used for compacting soil. FIG. 3, in turn, illustrates a waste compactor as used in landfills. The compaction machines 1 typically comprise a machine frame 3 with an operator platform 2 and a travel mechanism with which they move in or against a working direction a over the ground 8 to be compacted. For this purpose, the tandem roller according to FIG. 1 has, for example, a front and a rear compaction drum 5 as travel units 52. The single-drum roller shown in FIG. 2 has a compaction drum 5 at the front and wheels 7 at the rear as travel units 52. The compaction drums 5 may optionally comprise an oscillation or vibration exciter that influences the compaction performed by the compaction drum 5. The waste compactor according to FIG. 3 has only drum-like wheels 7 and also includes a dozer blade 9 that can be used to spread landfill material. All of the embodiments of the compaction machine 1 shown are driven by an electric motor 4 as the primary drive unit or as the traction drive system, and also have a hydraulic system 6. Further, all of the machines shown comprise an accumulator for electric energy or a fuel cell, which is referred to below by way of example as a battery 32. In order to carry out the method and also to control all the involved components of the compaction machine 1, these also comprise, in particular, a control device 10 which, for example, is part of the on-board computer or itself constitutes the on-board computer. In addition, the control device 10 preferably also comprises operating elements, for example control levers or the like, via which an operator controls the compaction machine 1.

Figure 4:
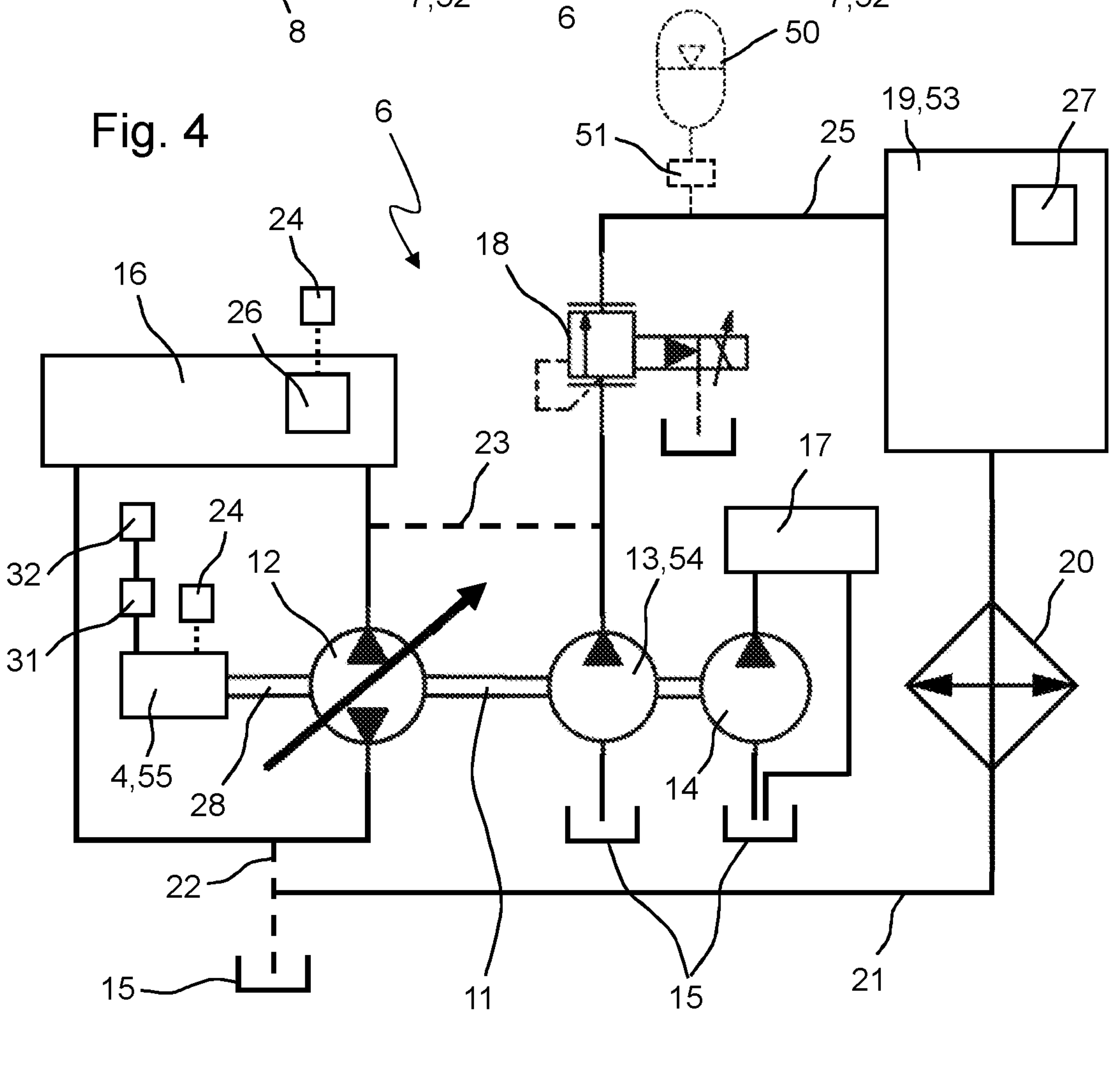
FIG. 4: shows a diagram of a part of the hydraulic system of a compaction machine relevant in the present context.

FIG. 4 shows an example of a part of the hydraulic system 6 of the compaction machine 1. In the present embodiment example, all hydraulic pumps of the hydraulic system 6 are preferably driven by the electric motor 4, in particular via an output shaft 28. The electric motor 4 is driven from an accumulator for electric energy, for example a battery 32. A converter 31 or inverter may be arranged between the electric motor 4 and the battery 32. For example, the electric motor 4 drives a traction pump 12 in this way, which is part of a, preferably closed, traction drive hydraulic circuit 16. The traction drive hydraulic circuit 16 preferably comprises at least one traction motor 26, which converts the volume flow of the traction pump 12 into a drive torque for a travel unit 55, in particular a compaction drum 5 or a wheel 7, for moving the compaction machine 1 forward and passes it on to the latter, for example via a shaft. In this case, the electric motor 4 is thus a device which drives the travel unit 55 indirectly. A brake hydraulic pump 54, specifically a steering feed pump 13, is preferably also driven by the output shaft 28 of the electric motor 4. The steering feed pump 13 is preferably part of a brake hydraulic circuit 53, in this case a steering hydraulic circuit 19, which in particular comprises a steering device 27, which is for example a steering orbitrol. The steering feed pump 13 may be a fixed displacement pump. However, a variable displacement pump may also be used to also vary the generated braking torque by changing the delivery volume of the steering feed pump. A throttle 18 is preferably arranged in the hydraulic line 25 between the steering feed pump 13 and the steering device 27. This throttle may preferably be configured as a proportional pressure-limiting valve, as indicated in the embodiment example shown. In addition, a cooler 20 may also be arranged in the steering hydraulic circuit 19, which interacts with a fan, for example, and via which heat is dissipated from the hydraulic medium into the ambient air. What is important is that there is a mechanical coupling 11 between the traction pump 12 and the steering feed pump 13. In the embodiment example shown, this mechanical coupling 11 may be realized, for example, by a through-drive unit or by a common arrangement of the two pumps on the output shaft 28 of the electric motor 4. The important thing here is that torque can be transmitted from the traction pump 12 to the steering feed pump 13 and vice versa. Finally, the hydraulic system 6 preferably has a further hydraulic circuit, more specifically a working hydraulic circuit 17 with a working pump 14, which is likewise driven by the electric motor 4 and in particular also via its output shaft 28. The pumps 12 and 14 may be arranged in a tandem arrangement. The working hydraulic circuit 17 is provided, for example, for operating a vibration exciter in a compaction drum 5.

As shown in FIG. 4, it is preferred that the traction drive hydraulic circuit 16, the steering hydraulic circuit 19 and the working hydraulic circuit 17 each have their own pump exclusively dedicated to that circuit. In the respective circuit, therefore, hydraulic energy is preferably exclusively generated via the pump associated with the respective circuit. Nevertheless, the steering feed pump 13 is preferably also configured as a feed pump for the traction drive hydraulic circuit 16. This means that a feed line 23 is preferably branched off from the steering hydraulic circuit 19 to supply hydraulic fluid to the traction drive hydraulic circuit 16. The valves etc. required for this are known to the person skilled in the art and are therefore not shown. Preferably, however, the feed line 23 merely provides for cross-scavenging of the traction drive hydraulic circuit 16 and compensates for any leakage losses occurring in the closed traction drive hydraulic circuit. No drive energy is transferred between the steering hydraulic circuit 19 and the traction drive hydraulic circuit 16 via this line. For leakage losses and cross-scavenging, the traction drive hydraulic circuit 16 preferably has a traction return path 22 that opens into the tank 15, for example a hydraulic tank. The steering hydraulic circuit 19 also preferably has a return line, specifically the steering return path 21. Preferably, the traction return path 22 and the steering return path 21 are merged to then open into the tank 15 as a common return line.

Figure 5:
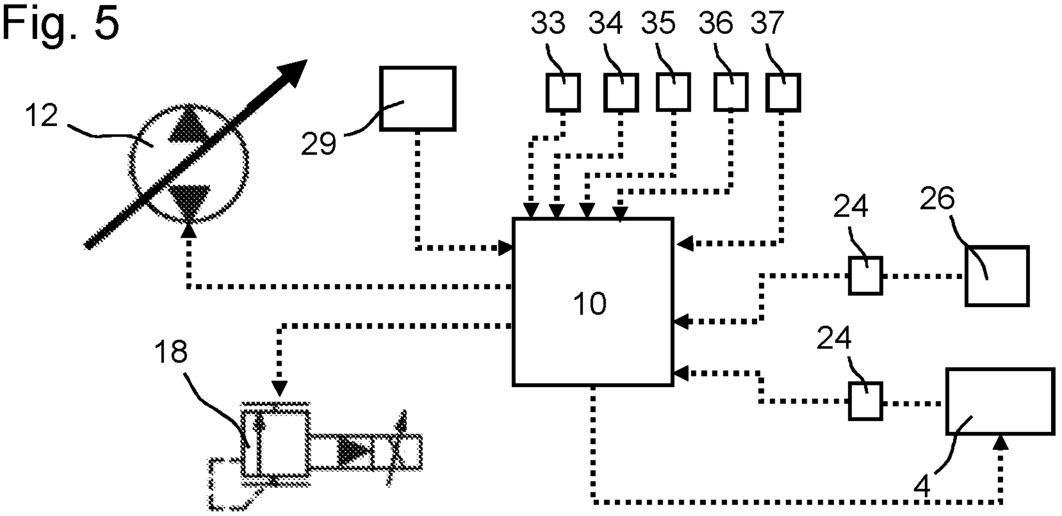
FIG. 5: shows a diagram of the control device and its respective connections to other components.

As also shown in FIG. 4, there is preferably at least one speed sensor 24 connected to the electric motor 4 and/or to a traction motor 26. Multiple speed sensors 24 may also be provided to collect the respective data at said components. In particular, the speed sensor 24 is configured to measure the actual speed of the electric motor 4 and/or the actual travel speed of the compaction machine 1 and to transmit these to the control device 10. This is also shown in FIG. 5. The dotted arrows in FIG. 5 indicate the direction of the information flow, for example from the traction motor 26 via the speed sensor 24 to the control device 10 and also from the electric motor 4 via a speed sensor 24 to the control device 10. FIG. 5 also shows other sensors that can be used. For reasons of clarity, these are not shown separately again in FIGS. 4 and 8. For example, there is a temperature sensor 33 at the electric motor 4 and/or at the converter 31 or inverter and/or at the battery 32. Additionally or alternatively, a state of charge sensor 34 may also be provided at the battery 32. Further, an amperemeter 35 may be provided to determine the amperage through the electric motor 4 and/or through the converter 31 or inverter. Again additionally or alternatively, a torque sensor 36 may be provided at the electric motor 4. Finally, another temperature sensor 37 may also be provided to determine the temperature in the steering hydraulic circuit 19. The measured values of all the sensors mentioned are transmitted to the control device 10, which uses them, except for the temperature in the steering hydraulic circuit 19, as the target value of the operating parameter. In addition, the control device 10 preferably determines a target value for the respective operating parameter under consideration, for example the target speed of the electric motor 4 and/or the target travel speed of the compaction machine 1. For this purpose, the control device 10 is connected, for example, to an operating element 29 via which an operator can input control commands to the control device 10 for controlling the compaction machine 1. The operating element 29 may thus be, for example, a control lever or also, for example, a brake lever. The control device 10 preferably derives the target speed of the electric motor 4 and/or the target travel speed of the compaction machine 1 from the respective specifications of the operator. Alternatively, these values may also be derived from an operating situation or an operating state of the compaction machine 1 or from safety considerations.

The temperature in the steering hydraulic circuit 19 may be used to ensure that the steering hydraulic circuit 19 does not overheat due to the provision of the braking torque at the steering feed pump 13. For example, a braking torque may be provided to the steering feed pump 13 only when the temperature in the steering hydraulic circuit 19 is below a predetermined threshold value. The threshold value is then selected accordingly such that safe operation of the steering hydraulic circuit 19 and in particular of the steering device 27 is ensured.

The control device 10 thus preferably receives both driving instructions from the operator and actual values of various parameters of the compaction machine 1. For example, the control device 10 may determine whether the identified actual values, for example of the speed and/or the travel speed, exceed the target values, for example also by a certain threshold value and/or beyond the duration of a tolerance time. Based on this information, the control device 10 then preferably controls the components of the compaction machine 1. In particular, the control device 10 controls the speed of the electric motor 4, the delivery volume of the traction pump 12 and the flow resistance of the throttle 18.

Optionally, furthermore, a hydraulic accumulator 50 may be connected to the hydraulic line 25 of the steering hydraulic circuit 19, in particular to the hydraulic line 25 between the steering feed pump 13 and the steering device 27, via an accumulator charge-discharge valve 51, so that hydraulic energy can be stored, at least transitionally, and can also be fed into the steering hydraulic circuit (or also other hydraulic circuits, in particular for driving work functions, such as the lifting and lowering of an edge cutter, etc.).

Figure 6:
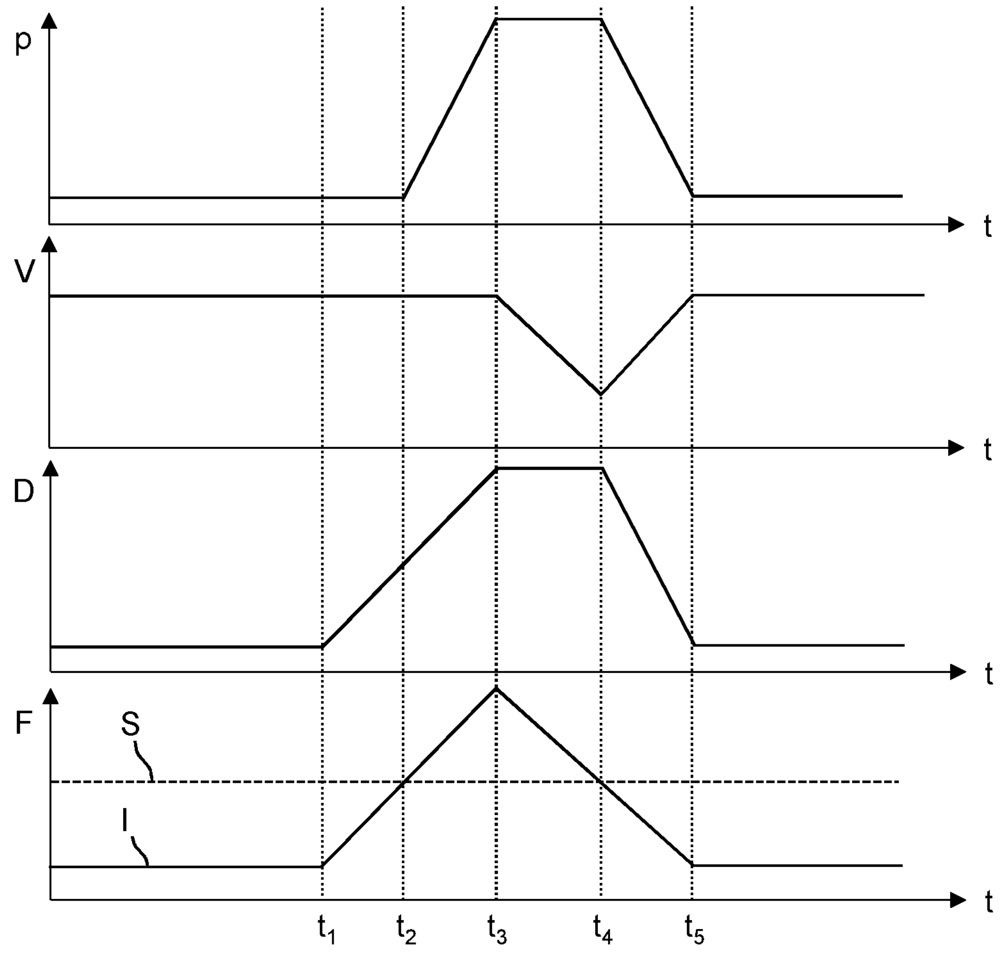
FIG. 6: shows a time sequence of various parameters in an exemplary application scenario.

FIG. 6 shows the schematic time sequence of a specific application scenario. In particular, the travel speed F of the compaction machine 1 is considered here. However, such a sequence would be analogous or at least very similar for other operating parameters, so that only this case is discussed below as an example. In the diagrams shown, the time t is plotted on the abscissa, while different parameters, explained below, are plotted on the ordinates. The diagrams are arranged such that the times $t_1$ to $t_5$ in each of the diagrams describe the same point in time. For example, the lowest diagram shows the travel speed F of the compaction machine 1 over time. It shows both the progression of the actual value I of the travel speed F and its target value S. For example, the compaction machine 1 travels in working operation with constant travel speed F on level ground 8 until time $t_1$. From time $t_1$, the compaction machine 1 descends a slope, causing the compaction machine 1 to accelerate and the travel speed F to increase. At time $t_2$ the travel speed F exceeds the target value S and continues to accelerate until time $t_3$. At time $t_3$ a trend reversal occurs and the travel speed F decreases until, at time $t_4$, it falls below the target S again and at time is it has decreased back to the initial value. The top diagram shows the pressure drop p across the throttle 18 in terms of amount. The pressure drop p is proportional to the braking torque generated, so that this is also represented by this diagram. Since no braking torque is required at the steering feed pump 13 during normal working operation of the compaction machine 1, the pressure drop p remains constant until time $t_2$, for example at zero. At time $t_2$, at which the actual value I of the travel speed F exceeds the target value S, the control device 10 controls the throttle 18 and increases its flow resistance, so that a pressure drop p occurs at the throttle 18. With the pressure drop p, there is also a proportional braking torque at the steering feed pump 13, which can be used to support a torque at the traction pump 12 caused by the overrun and thus contribute to the braking of the compaction machine 1. The control device 10 adjusts the braking torque in particular in proportion to the extent to which the actual value of the travel speed F exceeds the target value S. Since the travel speed F between times $t_2$ and $t_3$ continues to increase, for example because the braking torque is insufficient to compensate for the acceleration due to the slope, the pressure drop p and the resulting braking torque also increase during this time period. From time $t_3$, the travel speed F decreases. However, at least in the case shown, the pressure drop p at the throttle 18 is maintained by the control device 10 at the level reached until the travel speed F falls below the target value at time $t_4$. Only from this point does the control device 10 then reduce the pressure drop p, for example back to zero.

The two middle diagrams in FIG. 6 show the delivery volume V and the speed D of the traction pump 12. Up to time $t_3$, the speed D of the traction pump 12 essentially follows the travel speed F. Up to this point, the delivery volume V of the traction pump 12 also remains constant. However, if the delivery volume V of the traction pump 12 remained constant beyond this time $t_3$, the speed D of the traction pump 12 would decrease again in line with the traction speed F. However, to enable efficient braking by the braking torque at the steering feed pump 13, it is advantageous if a sufficiently high torque is transmitted from the traction pump 12 to the steering feed pump 13. In order to make this possible also in this temporal section of the method, it is preferred that the control device 10 controls the traction pump 12 such that its delivery volume V is reduced. Due to the reduced delivery volume V, the speed D of the traction pump 12 acting as a motor is increased, or in this case at least kept constant, in order to be able to absorb the volume flow coming from the traction motor 26 acting as a pump. In this way, the speed D of the traction pump 12 does not drop analogously to the travel speed F and a higher speed is transmitted to the steering feed pump 13 via the mechanical coupling 11, which in turn causes a higher braking torque, in particular toward the throttle 18, via the volume flow in the steering hydraulic circuit 19 caused by this. Overall, therefore, the braking performance can be improved in this way.

Figure 7:
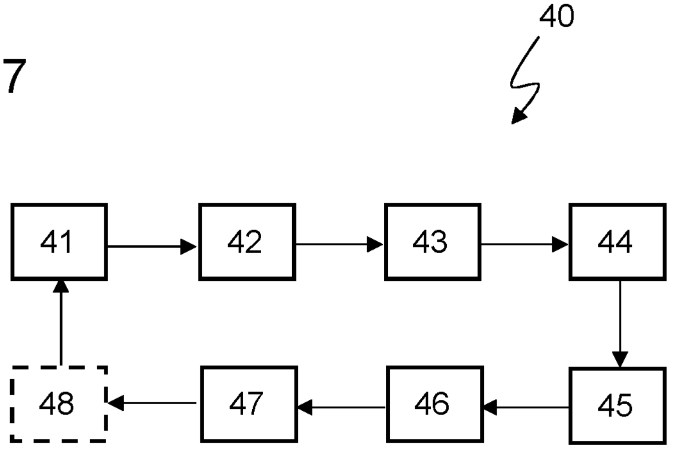
FIG. 7: shows a flow chart of the method.

FIG. 7 shows a flowchart of the method 40. The method 40 starts by driving 41 the traction pump 12 in the traction drive hydraulic circuit 16 of the compaction machine 1 by the electric motor 4. It further comprises driving 42 the steering feed pump 13 in the steering hydraulic circuit 19 of the compaction machine 1 by the electric motor 4. The steering feed pump 13 also feeds hydraulic fluid into the traction drive hydraulic circuit 16. It is coupled to the traction pump 12 via a mechanical coupling 11 so that torques can be transmitted between the two points. This is followed by determining 43 an actual value of an operating parameter, for example an actual speed of the electric motor 4 and/or an actual travel speed of the compaction machine 1 or a parameter correlating therewith, and determining 44 a target value of the operating parameter, for example a target speed of the electric motor 4 and/or a target travel speed of the compaction machine 1 or a parameter correlating therewith. In particular, these values are forwarded to or collected by the control device 10. In particular, the control device 10 then performs comparing 45 of the actual value of the operating parameter, for example the actual speed and/or the actual travel speed or the parameter correlating therewith, with the target value of the operating parameter, for example the target speed and/or the target travel speed or the parameter correlating therewith. Specifically, the control device 10 identifies cases in which the actual value, for example the actual speed and/or the actual travel speed or the parameter correlating therewith, is greater than the target value, for example the target speed and/or the target travel speed or the parameter correlating therewith. If such a case is detected, the method comprises generating 46 a braking torque 46 at the steering feed pump 13 by a hydraulic throttle 18. For this purpose, the hydraulic throttle 18 is preferably arranged in the hydraulic line 25 between the steering feed pump 13 and the steering device 27 in the steering hydraulic circuit 19. In particular, the hydraulic throttle 18 is controlled by the control device 10 such that its flow resistance increases. The torque required to overcome this flow resistance is available at the steering feed pump 13 as braking torque and can be transmitted to the traction pump 12 via the mechanical coupling 11. The method thus comprises transmitting 47 the braking torque from the steering feed pump 13 to the traction pump 12 of the traction drive hydraulic circuit 16 via the mechanical coupling 11. Optionally, and therefore shown in dashed lines in the figure, the method may further comprise reducing 48 a delivery volume V of the traction pump 12 to ensure that a sufficient speed for providing the braking torque is transmitted to the steering feed pump 13 even during the braking process despite the associated reduction of the volume flow in the traction drive hydraulic circuit 16.

Figure 8:
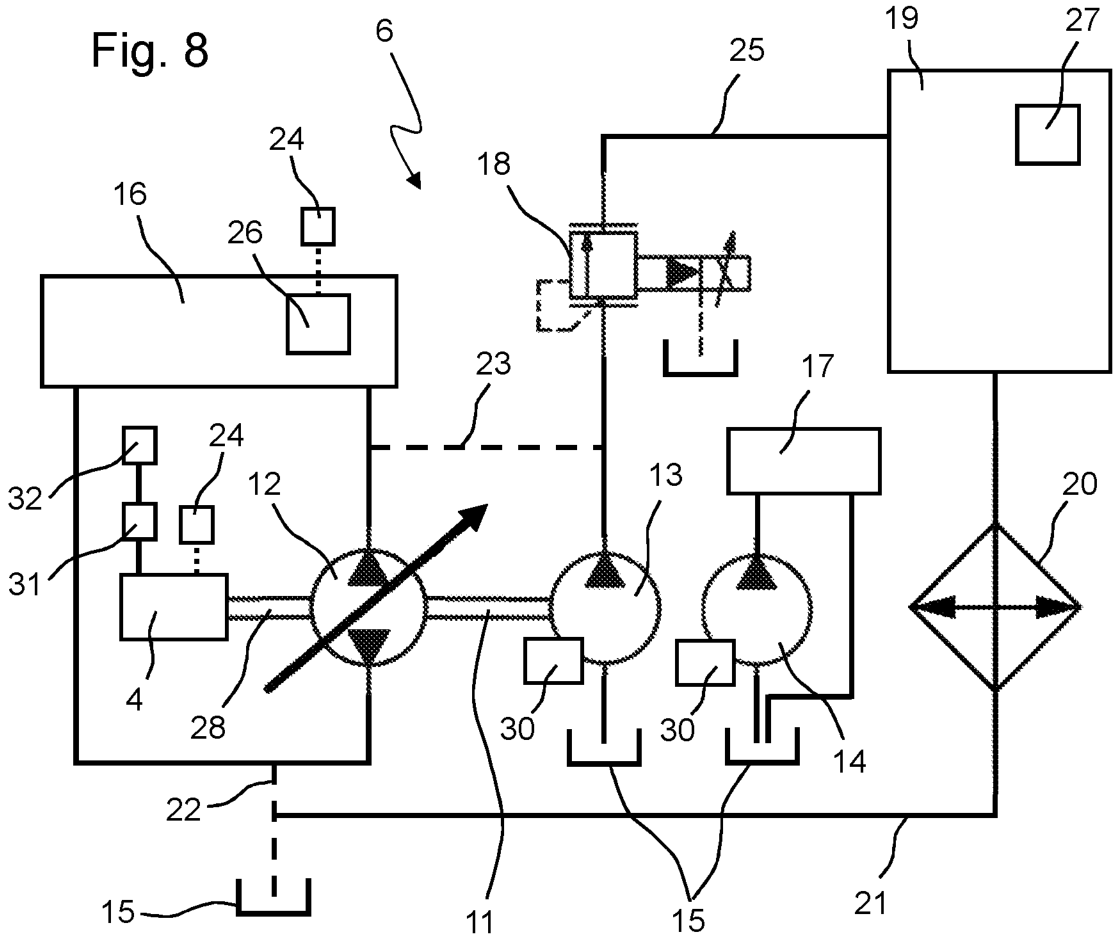
FIG. 8: shows an alternative embodiment of a hydraulic system of a compaction machine.

FIG. 8 shows an alternative embodiment in which the steering feed pump 13 and/or the working pump 14 are not driven by the electric motor 4, but may each have their own electric drive unit 30. The electric drive unit 30 may be an electric motor, for example. Importantly, also in this embodiment, the traction pump 12 is driven by the electric motor 4 and there is a mechanical coupling 11 between the traction pump 12 and the steering feed pump 13. The mechanical coupling 11 may be formed separately from the output of the electric motor 4. Otherwise, the embodiment of FIG. 8 corresponds to that of FIG. 4, so that reference is made to the previous discussion in order to avoid repetition.

Furthermore, irrespective of the specific embodiment example, a clutch, in particular a switchable clutch, may be comprised in the mechanical coupling 11. In this way, for example, the mechanical coupling between the traction pump 12 and the steering feed pump 13 may be interrupted at least temporarily.

Figure 9:
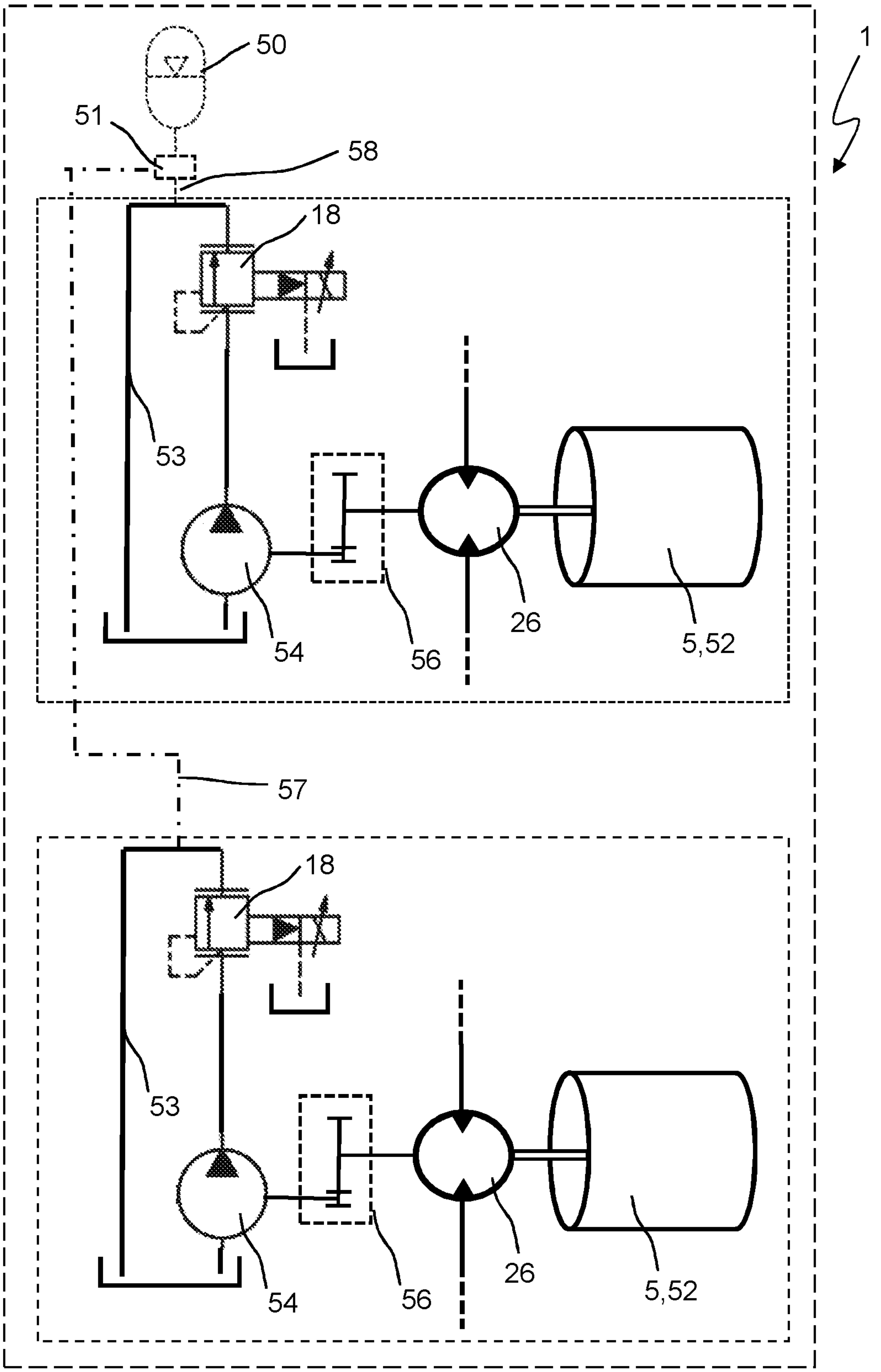
FIG. 9: shows a schematic of an alternative drive concept.

FIG. 9 illustrates an alternative or additional drive concept compared with the embodiment example. The special feature here is that the traction motor 26, which is also integrated in a traction drive hydraulic circuit not further shown in FIG. 9, is connected by means of a transmission gearbox 56, for example a gear train, to a brake hydraulic pump 54 of a separate brake hydraulic circuit with a corresponding throttle 18. In this way, as also shown in FIG. 9, each individual travel unit, in particular each individual compaction drum 5 of the compaction machine 1, may be assigned its own brake hydraulic circuit and the braking effect generated by the brake hydraulic circuit can be controlled individually. In this case, the traction motor 26 represents a device which drives the travel unit 52 directly.

Here, too, a hydraulic accumulator 50 with an accumulator charging valve 51 may optionally be provided, although it is possible to assign each of the two brake hydraulic circuits 53 its own, and thus separate, hydraulic accumulator 50 or, as shown in FIG. 9, to assign both brake hydraulic circuits 53 (or even more than two) a common hydraulic accumulator 50. The common hydraulic accumulator 50 is connected to the two brake hydraulic circuits via corresponding connecting lines 57, 58, which are merged in a common accumulator charging valve 51, but which may also be connected to the hydraulic accumulator via individual, independent accumulator charging valves 51. It will be appreciated that the arrangements provided in FIG. 9 for two travel units in a compaction machine 1 may also be provided for only one travel unit of a compaction machine.

Figure 10:
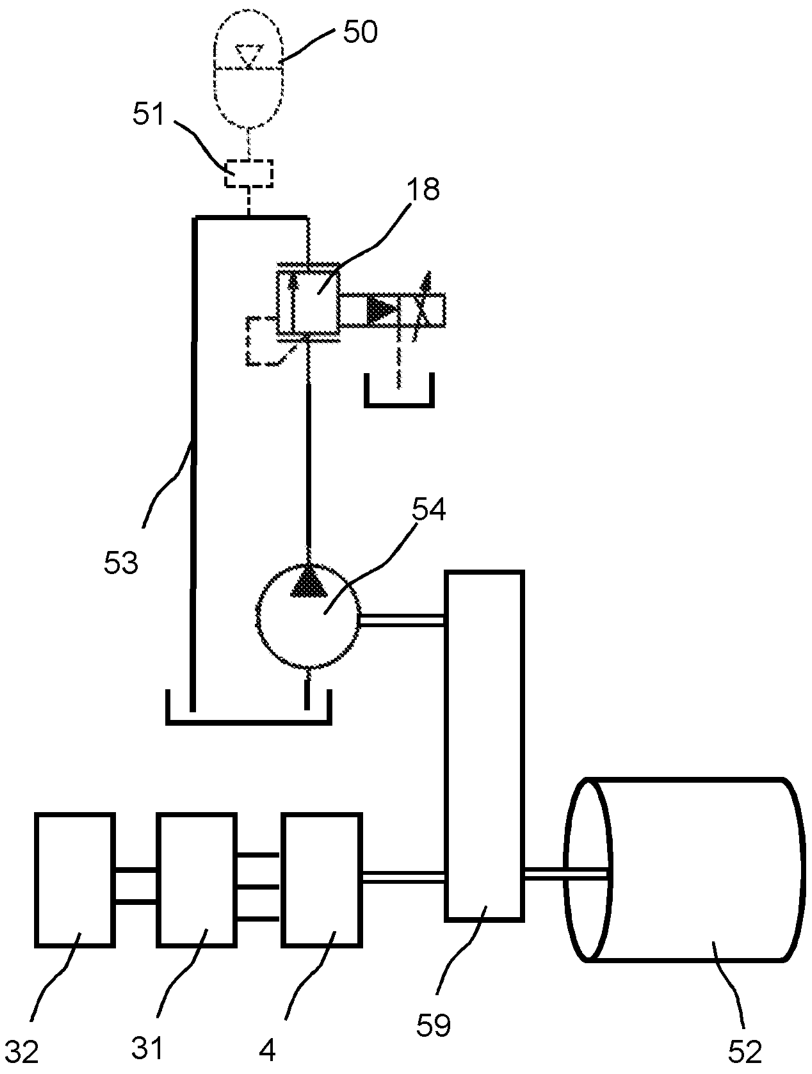
FIG. 10: shows a schematic of another alternative drive concept.

In the drive concept shown in FIG. 10, one of the special features is that the travel unit 52 is driven practically directly by the electric motor 4, in particular without the interposition of a hydraulic transmission stage, with a transmission gearbox 59 being interposed for this purpose. Via this transmission gearbox, the electric motor is mechanically coupled to the brake hydraulic pump 54 and the other components 53 and 18, as already explained with reference to FIG. 9. Also for this embodiment, a hydraulic accumulator 50 may optionally be connected to the brake hydraulic circuit via an accumulator charging valve 51.

For all of the variants with hydraulic accumulator 50 described in the embodiment examples, it is further possible to provide further hydraulic line branches, but this is not shown in the figures. These hydraulic line branches may be configured to supply hydraulic energy stored in the hydraulic accumulator 50 to further consumers, for example working units such as an edge cutter, etc., and/or to enable additional functionalities, such as a boost function for the traction drive system.

Figure 11:
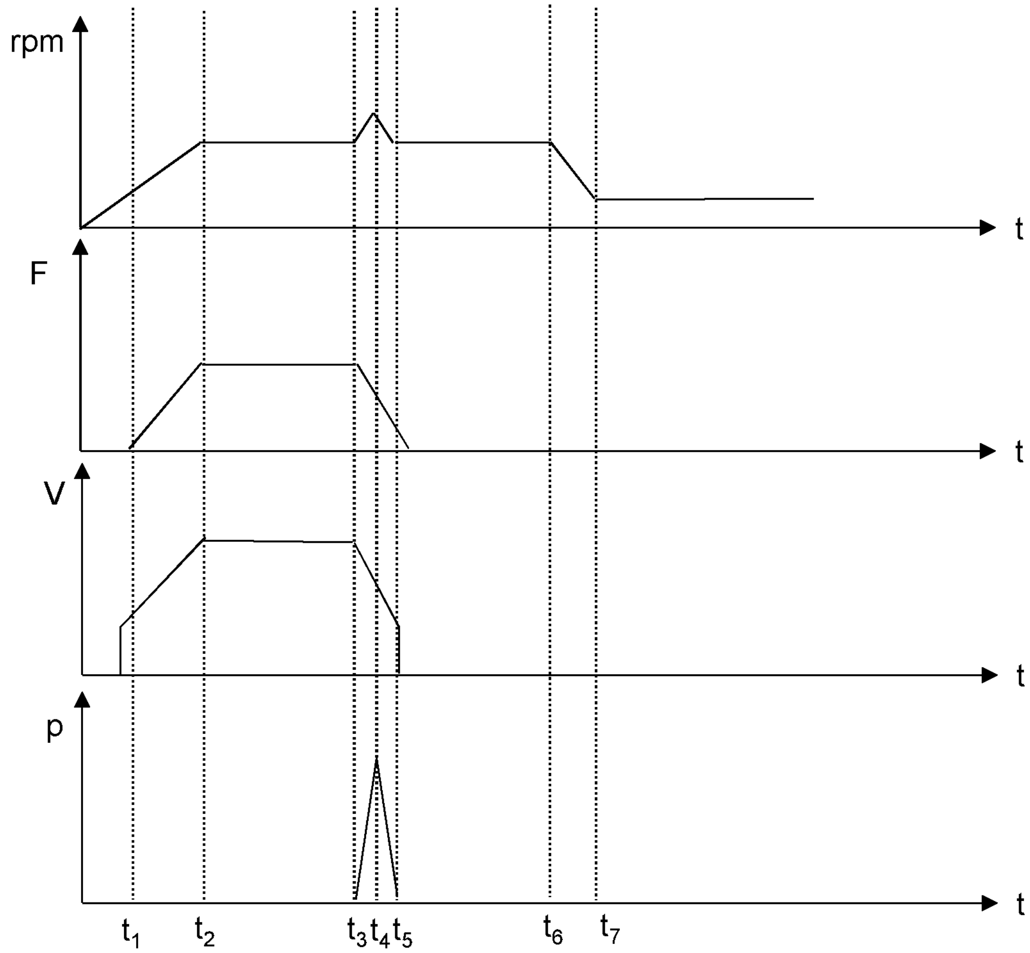
FIG. 11: shows a time sequence of various parameters in another exemplary application scenario.

Finally, FIG. 11 illustrates exemplary curves for the speed rpm of the electric motor, the progression of the travel speed, the delivery volume V of the traction pump 12 and the pressure p between the pump 13/54 and the throttle 18 for the embodiment example shown in FIG. 4. The shown curves relate to a situation in which the compaction machine starts on a horizontal surface and accelerates (t1 to t2), travels at a constant speed (t2 to t3) and then decelerates back to a standstill (t3 to t5). In addition to the above explanations, it is important to note here that the pressure built up via the throttle 18 (t3 to t4) is used for braking and, at the same time, a speed increase of the electric motor is considerably reduced. For an effective braking process, the delivery volume V of the traction pump is reduced at the same time. In this way, overshooting of the speed of the electric motor can be avoided even in this operating situation and, at the same time, the braking torque generated by the throttle can be used to brake the compaction machine.

Overall, in a compaction machine with a hydraulic system, which is driven by an electric motor and no longer has an internal combustion engine as a traction drive system, the present invention enables efficient and reliable braking by means of a mechanical-hydraulic coupling with a throttle. The fact that this throttle is arranged outside the traction drive hydraulic circuit results in a number of advantages that have already been mentioned above.

What is claimed is:

1. A method for braking a compaction machine, comprising the steps of:

a) directly or indirectly driving a travel unit using an electric motor;

b) determining an actual value of an operating parameter;

c) determining a target value of the operating parameter;

d) comparing the actual value of the operating parameter with the target value of the operating parameter;

e) generating a braking torque by a hydraulic throttle in a brake hydraulic circuit, the brake hydraulic circuit comprising a brake hydraulic pump, if the actual value of the operating parameter deviates from the target value, the hydraulic throttle being arranged in a hydraulic line with a hydraulic pump;

f) transmitting the braking torque via a mechanical coupling from the brake hydraulic pump to a drive device directly or indirectly driving the travel unit;

wherein the compaction machine comprises a hydraulic system and in step a), driving a traction pump in a traction drive hydraulic circuit of the compaction machine by the electric motor;

additionally driving a steering feed pump in a steering hydraulic circuit of the compaction machine, wherein the steering feed pump also feeds hydraulic fluid into the traction drive hydraulic circuit, and wherein the steering feed pump is coupled to the traction pump via the mechanical coupling;

in step e), generating the braking torque at the steering feed pump by the hydraulic throttle if the actual value of the operating parameter deviates from the target value, the hydraulic throttle being arranged in the hydraulic line between the steering feed pump and a steering device in the steering hydraulic circuit; and in step f), transmitting the braking torque from the steering feed pump to the traction pump of the traction drive hydraulic circuit via the mechanical coupling from the brake hydraulic pump to the drive device directly or indirectly driving the travel unit.

2. The method according to claim 1, wherein the operating parameter is:

a speed of the electric motor; and/or a travel speed of the compaction machine; and/or a temperature of the electric motor and/or a converter and/or a battery; and/or a state of charge of a battery; and/or an amperage applied to or output at the electric motor and/or a converter; and/or a torque at the electric motor.

3. The method according to claim 1, wherein in step e), generating the braking torque at the steering feed pump by the hydraulic throttle if the actual value of the operating parameter is greater than the target value of the operating parameter.

4. The method according to claim 1, wherein during transmitting of the braking torque, reducing of a displacement of the traction pump is performed.

5. The method according to claim 1, wherein:

a tolerance range is provided such that generating of the braking torque at the steering feed pump is only performed when the actual value of the operating parameter exceeds a threshold value above the target value of the operating parameter; and/or a tolerance time is provided such that generating of the braking torque at the steering feed pump is only performed when the actual value of the operating parameter is increased compared to the target value of the operating parameter for longer than the tolerance time.

6. The method according to claim 5, wherein the tolerance range and/or the tolerance time is dynamically adapted to the actual value of the operating parameter by a control device.

7. The method according to claim 1, wherein the braking torque set at the steering feed pump is increased as long as a difference between the actual value of the operating parameter and the target value of the operating parameter increases, wherein the braking torque is kept constant after an increase in the braking torque until the actual value of the operating parameter has fallen back to or below the target value of the operating parameter.

8. The method according to claim 1, wherein the hydraulic system comprises a working hydraulic circuit separate from the traction drive hydraulic circuit and the steering hydraulic circuit, the working hydraulic circuit being operated exclusively by a working pump separate from the steering feed pump.

9. The method according to claim 1, wherein determining of a temperature in the steering hydraulic circuit is performed, and no braking torque is generated at the steering feed pump by the hydraulic throttle when the temperature in the steering hydraulic circuit is greater than a predetermined threshold value.

10. The method according to claim 1, wherein a return path of the steering hydraulic circuit and a return path of the traction drive hydraulic circuit are merged and fed together into a tank.

11. The method according to claim 1, wherein when the braking torque is transmitted via the mechanical coupling from the brake hydraulic pump to the drive device directly or indirectly driving the travel unit a speed transmission takes place.

12. The method according to claim 1, wherein a hydraulic traction motor is couplable via the mechanical coupling to the brake hydraulic pump, the brake hydraulic pump being part of the brake hydraulic circuit separate from the traction drive hydraulic circuit, and the hydraulic throttle being arranged in the brake hydraulic circuit, downstream of the brake hydraulic pump, with the step that generating of the braking torque is performed at the brake hydraulic pump by the hydraulic throttle, and that transmitting of the braking torque from the brake hydraulic pump via the mechanical coupling to the hydraulic traction motor of the traction drive hydraulic circuit is performed.

13. The method according to claim 1, wherein the brake hydraulic circuit comprises a hydraulic accumulator connected downstream of the hydraulic throttle via an accumulator charging valve, the hydraulic accumulator being charged by hydraulic fluid delivered in the brake hydraulic circuit by the brake hydraulic pump.

14. The method according to claim 1, wherein the compaction machine has a control device.

15. The compaction machine method according to claim 14, wherein the compaction machine has at least one of the following features:

the traction pump is a variable displacement pump;

the steering feed pump is a fixed displacement pump;

the traction drive hydraulic circuit is a closed circuit;

the hydraulic throttle is a proportional pressure-limiting valve;

the hydraulic throttle is controllable by the control device;

a working hydraulic circuit separate from the traction drive hydraulic circuit and the steering hydraulic circuit and having a working pump;

the steering feed pump and hydraulic lines the steering feed pump supplies are free of priority valves;

a speed sensor is provided at the electric motor and/or at a traction motor of the traction drive hydraulic circuit, which is connected to the control device;

the speed sensor is configured to determine an actual speed of the electric motor and/or an actual travel speed of the compaction machine;

a temperature sensor is provided at the electric motor and/or at a converter and/or at a battery, which is connected to the control device and which is configured to determine an actual temperature of the electric motor and/or of the converter and/or of the battery;

a state of charge sensor is provided at the battery, which is connected to the control device and which is configured to determine an actual state of charge of the battery;

an amperemeter is provided at the electric motor and/or at the converter, which is connected to the control device and which is configured to determine an actual amperage through the electric motor and/or through the converter;

a torque sensor is provided at the electric motor, which is connected to the control device and which is configured to determine an actual torque of the electric motor;

a temperature sensor is provided in the steering hydraulic circuit, which is connected to the control device and which is configured to determine an actual temperature of the steering hydraulic circuit;

the control device is configured to determine the target value of the operating parameter;

the control device is configured to generate the braking torque at the steering feed pump by the hydraulic throttle;

a return path of the steering hydraulic circuit and a return path of the traction drive hydraulic circuit open together into a tank;

a hydraulic accumulator is connected to the steering hydraulic circuit via an accumulator charging valve.

16. The method according to claim 14, wherein the compaction machine has the travel unit driven by the electric motor, and a coupling gearbox via which the electric motor is mechanically couplable to the brake hydraulic pump of the brake hydraulic circuit, the brake hydraulic circuit comprising the hydraulic throttle downstream of the brake hydraulic pump.

17. The method according to claim 14, further comprising a further travel unit, wherein the further travel unit has a further brake hydraulic circuit separate from the brake hydraulic circuit of the travel unit, and further has at least one of the following features:

a separate hydraulic accumulator is assigned to each of the brake hydraulic circuit and the further brake hydraulic circuit;

a common hydraulic accumulator is provided, which is connected, via a respective supply line, to the brake hydraulic circuit and the further brake hydraulic circuit, via a respective accumulator charging valve or via a common accumulator charging valve;

the brake hydraulic circuit and the further brake hydraulic circuit are controllable independently of one another, and the control device is configured such that it controls the brake hydraulic circuit and the further brake hydraulic circuit independently of one another and/or taking into account current direction of travel.

18. The method according to claim 1, wherein the compaction machine is at least one of a tandem roller, a single-drum roller, a rubber-tired roller or a waste compactor.

* * * * *